United States Patent [19]

Bione et al.

[11] Patent Number: 4,757,460

[45] Date of Patent: Jul. 12, 1988

[54] COMMUNICATIONS NETWORK WITH INDIVIDUALIZED ACCESS DELAYS

[75] Inventors: Angelo A. Bione, Elmhurst; Semir Sirazi, Chicago, both of Ill.

[73] Assignee: Zenith Electronics Corporation, Glenview, Ill.

[21] Appl. No.: 745,334

[22] Filed: Jun. 14, 1985

[51] Int. Cl.⁴ .............................................. H04J 3/02
[52] U.S. Cl. ................................. 364/514; 340/825.5; 370/85
[58] Field of Search ............. 340/825.21, 825.2, 825.5, 340/825.51; 364/514; 307/39, 40; 455/4, 5; 370/85, 89, 94; 358/86

[56] References Cited

U.S. PATENT DOCUMENTS

| | | | |
|---|---|---|---|
| 4,177,450 | 12/1979 | Sarrand | 340/825.5 |
| 4,412,326 | 10/1983 | Limb | 340/825.5 |
| 4,432,088 | 2/1984 | Frankel | 340/825.5 |
| 4,466,096 | 8/1984 | Heins et al. | 340/825.5 |
| 4,498,169 | 2/1985 | Rozmus | 340/825.5 |
| 4,506,361 | 3/1985 | Kume | 340/825.5 |
| 4,560,984 | 12/1985 | Scholl | 340/825.5 |
| 4,583,089 | 4/1986 | Cope | 340/825.5 |
| 4,598,285 | 7/1986 | Hoshen | 340/825.5 |
| 4,633,462 | 12/1986 | Stifle et al. | 370/85 |

FOREIGN PATENT DOCUMENTS

| | | | |
|---|---|---|---|
| 2202573 | 7/1973 | Fed. Rep. of Germany | 340/825.2 |
| 2319569 | 11/1973 | Fed. Rep. of Germany | 455/5 |

*Primary Examiner*—G. P. Tolin
*Assistant Examiner*—Geoffrey S. Evans

[57] ABSTRACT

A broadband communications network includes a plurality of stations interconnected through selected forward and reverse channels by a network translator. Each station continuously monitors the forward channel for detecting the presence or absence of a forward channel carrier. A given station is allowed to transmit a data packet as modulation of the reverse channel carrier only after the expiration of a predetermined time interval during which no carrier is detected on the forward channel. By establishing the predetermined time interval for each respective station in inverse relation to the distance of the station from the network translator, a synchronized transmission time base as well as equalized station access is achieved for improving network performance.

6 Claims, 2 Drawing Sheets

COMMUNICATIONS NETWORK WITH INDIVIDUALIZED ACCESS DELAYS

BACKGROUND OF THE INVENTION

The present invention relates generally to broadband communication networks such as local area networks (LANs) and metropolitan area networks (MANs) and particularly concerns a technique for providing equalized user access to and increased throughput in such networks.

Broadband LANs and MANs typically employ a two-waY cable television (CATV) plant to facilitate data communication between the user stations connected to the plant. Such data communication is effected by a source station transmitting an upstream data packet to the CATV headend which then retransmits the data packet downstream for reception by the desired receiving station. The upstream transmission from the source station is generally accomplished by means of an upstream channel (sometimes referred to as the reverse channel) typically having a carrier frequency ranging from 5 MHz up to 35 MHz in sub-split CATV systems and up to 174 MHz in high-split system configurations. The CATV headend includes a network translator which converts the reverse channel carrier to a downstream channel (e.g., a 234 MHz carrier), also referred to as the forward channel, and re-transmits the data packet on this channel.

The transmitted data packet originating at the source station includes an address code identifying the desired receiving station such that, upon re-transmission over the forward channel by the headend network translator, only the station identified by the address code will receive and decode the data packet. Also, the data packet is suitably coded to enable reception thereof by the source station which compares the received data packet with the transmitted data packet to verify its integrity.

In order to improve the performance of such broadband networks, it has been proposed to use a protocol commonly used in baseband LANs; namely carrier-sense multiple-access with collision detection (CSMA/CD). In a network using CSMA/CD, a source station will defer transmission of a formulated data packet until the forward channel is clear (i.e., no carrier present on the channel). Even so, two or more source stations may transmit data packets at substantially the same time resulting in packet collisions which destroy the information content of the transmitted message. Detection of such data packet collisions may be accomplished by source stations in a number of ways, e.g., bit-bit comparisons, CRC comparisons, code violations, etc., and in response to which the source stations abandons the remainder of the transmission. Subsequently, the source station may re-transmit the packet after a random delay so as to reduce the probability of further collisions.

In networks of the type described above, it will be appreciated that the stations physically closer to the headend network translator will have an advantage in terms of access to the system. In particular, due to the propagation time of a packet over either the forward or reverse channel, stations physically further from the headend network translator will have a reduced probability of capturing the channel than closer-in stations thereby reducing their access to the system as well as the overall system throughput. Neither the CSMA/CD protocol nor the prior art technique of independently calculating a random delay at each source station before retransmitting a packet solves this unequal system access problem, and the reduced system throughput associated therewith, since packet propagation times are not taken into account.

Objects of the Invention

It is therefore a basic object of the present invention to provide an improved broadband communications network.

It is a more specific object of the invention to provide an improved broadband communications network wherein access to the system is afforded to all stations on an equalized basis for improving performance and providing packet synchronization.

It is a further object of the invention to provide an improved broadband communications network wherein station access is equalized on the basis of packet propagation times relative to each station.

BRIEF DESCRIPTION OF THE DRAWINGS

The features of the invention which are believed to be novel are set forth with particularity in the appended claims. The invention, together with its objects and advantages thereof, may best be understood by reference to the following description taken in conjunction with the accompanying drawings in which:

DESCRIPTION OF THE PREFERRED EMBODIMENT

Figure 1:
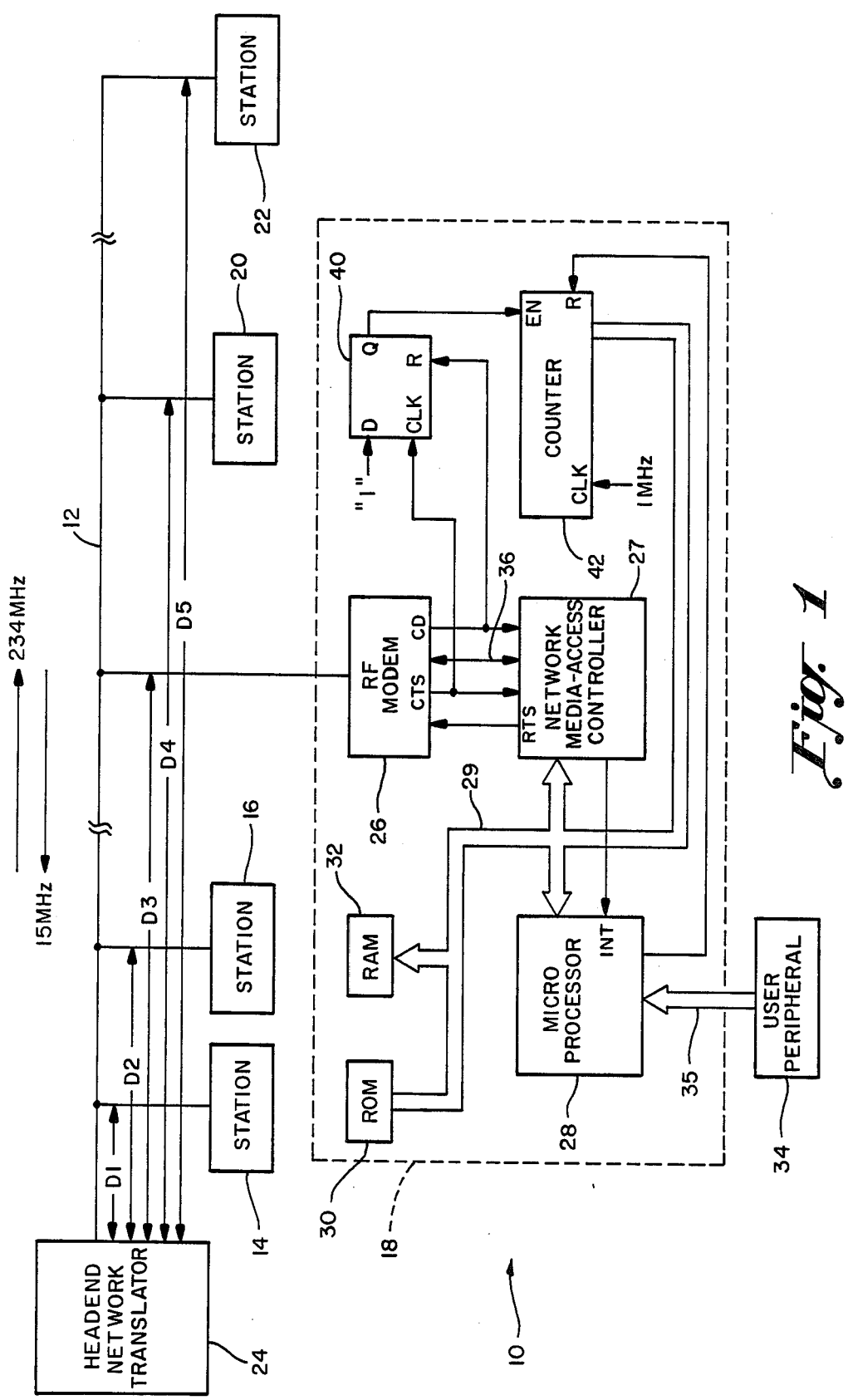
FIG. 1 is a block diagram illustrating a broadband communication according to the present invention.

Referring to FIG. 1, there is shown in block diagram form a broadband communications network 10 according to the present invention. Network 10, which may comprise, for example, a broadband LAN or MAN, includes a two-way cable plant 12 interconnecting a plurality of stations 14, 16, 18, 20 and 22 through a headend network translator 24, the stations 14–22 being spaced from network translator 24 by distances D1–D5 respectively. Network 10 comprises a plurality of forward channels, one such being at a frequency of 234 MHz as shown, for transmitting data packets in a downstream direction from network translator 24 to the stations and a plurality of reverse channels, one such being at a frequency of 15 MHz as shown, for transmitting data packets in an upstream direction from the stations to network translator 24.

Except for being spaced at different distances along cable 12 from headend network translator 24, each of the stations 14, 16, 18, 20 and 22 is substantially identical in configuration. Therefore, for simplicity, only station 18 is shown in detail in FIG. 1. Station 18 comprises an RF modem 26 for interfacing the station to the forward (234 MHz) and reverse (15 MHz) channels of cable plant 12. A network mediaaccess controller 27, which may comprise an Intel 82588 integrated circuit, is coupled to RF modem 26 and to a microprocessor 28 via a data bus 29. Also coupled to data bus 29 is a ROM 30 programmed for controlling the operation of microprocessor 28 and a RAM 32 for providing temporary storage for the station. A user peripheral 34, such as a personal computer, is coupled to microprocessor 28 by a bus 35 for providing data to be transmitted through the network and for receiving data transmitted through the network by other stations.

More particularly, assume that the user of station 18 desires to transmit a particular message to one of the other stations, e.g., station 14, connected to network 10. The message is initially composed in user peripheral 34 of station 18 and transferred therefrom to RAM 32 via bus 35, microprocessor 28 and bus 29. Thereafter, a ready-to-send (RTS) signal is coupled from network media-access controller 27 to RF modem 26. Upon assuming an operational status, RF modem 26 responds to the RTS signal by coupling a clear-to-send (CTS) signal to network media-access controller 27 whereupon the data is read from RAM 32, combined in controller 27 with the address codes of the source and destination stations to form a data packet and coupled therefrom to RF modem 26 over a bi-directional data line 36. The data packet modulates a carrier, e.g., 15 MHz, generated in modem 26 which is transmitted upstream through the reverse channel of cable plant 12 toward network translator 24. Network translator 24 frequency converts the received data packet for retransmission on a carrier, e.g., 234 MHz, downstream through the forward channel of cable plant 12. The retransmitted data packet is only acquired by station 14 to whom it was addressed and by the originating source station 18, the latter for the purpose of verifying the integrity of the retransmitted data packet. That is, the retransmitted data packet is received by modem 26 and coupled by data line 36 and network controller 27 for storage in RAM 32. Network media-access controller 27 then compares the received data packet to the packet originally transmitted by the station. If the comparison indicates that the two data packets are the same, it is assumed that the originally transmitted packet has been accurately received by station 14.

If the comparison indicates that the two data packets are not the same, it is assumed that the originally transmitted packet was not accurately received by station 14, either because it was mutilated by other packets or because it was garbled by a noisy channel. In the latter event, station 18 reschedules the packet for another attempt at transmission and this process continues until the accuracy of the retransmitted packet is verified by station 18.

The loss, or partial loss, of transmitted data packets in network 10 is often caused by collisions which result when two or more stations attempt substantially simultaneous transmissions of data packets. As described above, collision detection is accomplished by a transmitting station by comparing the data packet originally transmitted over the reverse channel with the retransmitted packet received from the forward channel, any differences therebetween indicating a collision and necessitating retransmission of the data packet by the transmitting station. In order to minimize the probability of data packet collisions, such transmissions or retransmissions may be affected in accordance with CSMA/CD protocol wherein data packet transmissions are initiated only after a station has established that there is no data carrier present on the forward channel. As a consequence, the stations physically closer to headend network translator 24 will have an advantage in terms of access to the network since the propagation time of a data packet between these closer-in stations and the network translator is relatively short in relation to stations spaced physically further therefrom. Thus, in terms of access to network 10, station 14 (spaced by distance D1 from network translator 24) has an advantage over station 16 (spaced by distance D2 from the network translator), which in turn has an advantage over station 18 (spaced by distance D3 from the network translator), and so on.

According to a primary aspect of the present invention access to the network 10 is equalized for increasing overall system throughput by establishing for each station a respective access delay. This access delay represents a time interval measured from the detection by a station of no carrier on the forward channel after which transmission of a data packet by the station is allowed. In a preferred embodiment of the invention, the access delay for each station is derived by subtracting the round-trip propagation time of a data packet between the respective station and network translator 24 (hereinafter referred to as loop delay) from a reference time selected to be somewhat greater than the maximum loop delay expected to be encountered by any station in the network. As will be explained in further detail hereinafter, the foregoing effectively configures the network such that each station appears to be located coincidentally with the station furthest from network translator 24 whereby transmissions on the network tend to be of a synchronous nature facilitating early collision detection and improved network performance.

As an example, assume that the loop delays for stations 14-22 are 100, 200, 300, 400 and 500 microseconds respectively and that a reference loop delay of 600 microseconds has been selected for network 10. In this case, respective access delays of 500, 400, 300, 200 and 100 microseconds will be established for stations 14-22. Thus, a transmission from station 14 will be allowed only after 500 microseconds following the detection by the station of no carrier on the forward channel, from station 16 only after 400 microseconds following such detection, from station 18 only after 300 microseconds following such detection, from station 20 only after 200 microseconds following such detection and from station 22 only after 100 microseconds following such detection. As a result, the system access advantage otherwise enjoyed by the stations physically closer to network translator 24 is compensated for by establishing an access delay interval for each station which is inversely related to the distance of the station from the network translator. This technique effectively equalizes access to network 10 while synchronizing data packet transmissions from all stations for improving data throughput and system performance.

Figure 2:
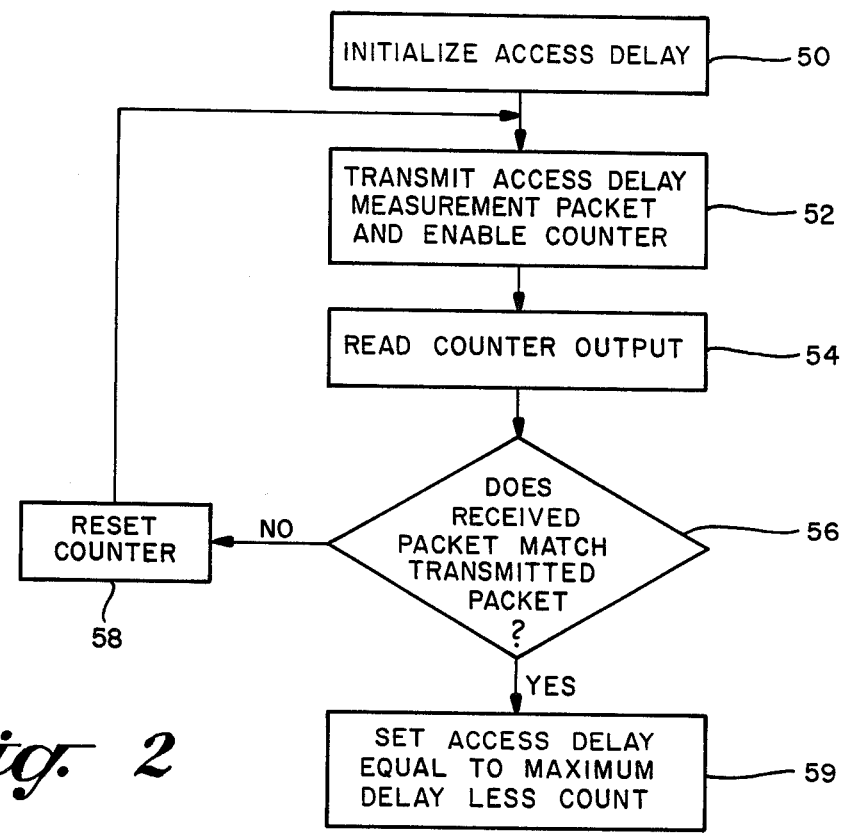
FIG. 2 is a chart depicting the operation of a station of FIG. 1 for establishing an access loop delay therefor.

Access delay intervals for the stations are preferably established as illustrated in the flow chart of FIG. 2. Upon installation of a station e.g., station 18, an access delay initialization routine 50 stored in ROM 30 is executed by microprocessor 28. According to step 52 of this routine, a predetermined access delay measurement packet stored in ROM 30 is transferred to RAM 32 and an RTS signal is applied to modem 26 by controller 27. In response to a reply CTS signal from modem 26 the stored access delay measurement packet is coupled through controller 27 and data line 36 to modem 26 for upstream transmission through the reverse channel to network translator 24. At the same time, the CTS signal clocks a D-type flip-flop 40 whose Q output goes to logical "1" for enabling a counter 42. Counter 42, whose clock input is driven by a 1 MHz clock signal, therefore begins counting at a 1 MHz rate at the same time that the access delay measurement packet is transmitted upstream by modem 26.

The transmitted access delay measurement packet is received by network translator 24 and retransmitted back to station 18 over the forward channel of network 10. Upon receiving a forward channel carrier, a carrier detect (CD) output of modem 26 resets flip-flop 40 for disabling counter 42. The CD output of modem 26, which is also coupled to controller 27, reflects the presence of a 234 MHz carrier on the forward channel in the form of the transmitted access delay measurement packet. As indicated by step 54 of the flow chart of FIG. 2, microprocessor 28 reads the output of counter 42 in response to a controller interrupt generated in response to the CD output of modem 26 and stores the count in RAM 32. This count represents the round trip propagation time or loop delay of the access delay measurement packet between station 18 and network translator 24 as well as the distance D3 therebetween. Next, a step 56 is executed by microprocessor 28 for verifying the received packet by comparing it with the transmitted packet. If the two packets are not the same, a step 58 is executed for resetting counter 42 and the initialization routine is re-executed beginning with step 52. After a match has been detected in step 56, a step 59 is executed wherein the access delay for the station is established. In particular, the access delay is derived and stored in a register in controller 27 by subtracting the count read from counter 42 from a reference representing the maximum loop delay expected to be encountered in the network. Referring to the previously presented example, the access delay for station 18 would therefore be derived by subtracting 300 microseconds (corresponding to the count accumulated by counter 42 during the round trip propagation time of the transmitted access delay measurement packet) from the selected reference loop delay of 600 microseconds. The resulting 300 microsecond access delay of station 18 is stored and subsequently used to define the time interval from the development of a $\overline{CD}$ signal by modem 26 after which transmission by station 18 is allowed.

More specifically, after the station access delays have been established as described above, one station (e.g., station 18) may transmit a data packet to another station (e.g., station 14) as follows. Initially, the data from peripheral 34 is transferred for temporary storage in RAM 32 of the station 18. In the meantime, modem 26 has been continuously monitoring the status of the forward channel of the network for the presence of a 234 MHz carrier. As soon as the absence of such carrier is detected, a $\overline{CD}'$ signal is applied by modem 26 to network mediaaccess 27 which activates an internal timer for counting an interval corresponding to the stored access delay of the station, the end of the interval defining a condition T during which transmission from the station is allowed. If a 234 MHz carrier is subsequently detected by modem 26, the CD signal applied to controller 27 toggles the condition T to T'(during which transmissions from the station are inhibited) and the process is repeated.

Once the transmission condition T has been established, an RTS signal is applied from controller 27 to modem 26 which responds thereto by applying a CTS signal back to the controller. This initiates transfer of the data stored in RAM 32 to controller 27 where it is combined with the address codes of the source (18) and destination (14) stations and coupled to modem 26 for transmission as a data packet over the reverse channel of the network. The transmitted packet is received by network translator 24, converted in frequency, and retransmitted through the forward channel from which it is received by station 14 as well as the transmitting station 18. Station 18 verifies the integrity of the transmission by comparing the received packet with the original packet and retransmits the data as described above if any discrepancies are noted.

Figure 3:
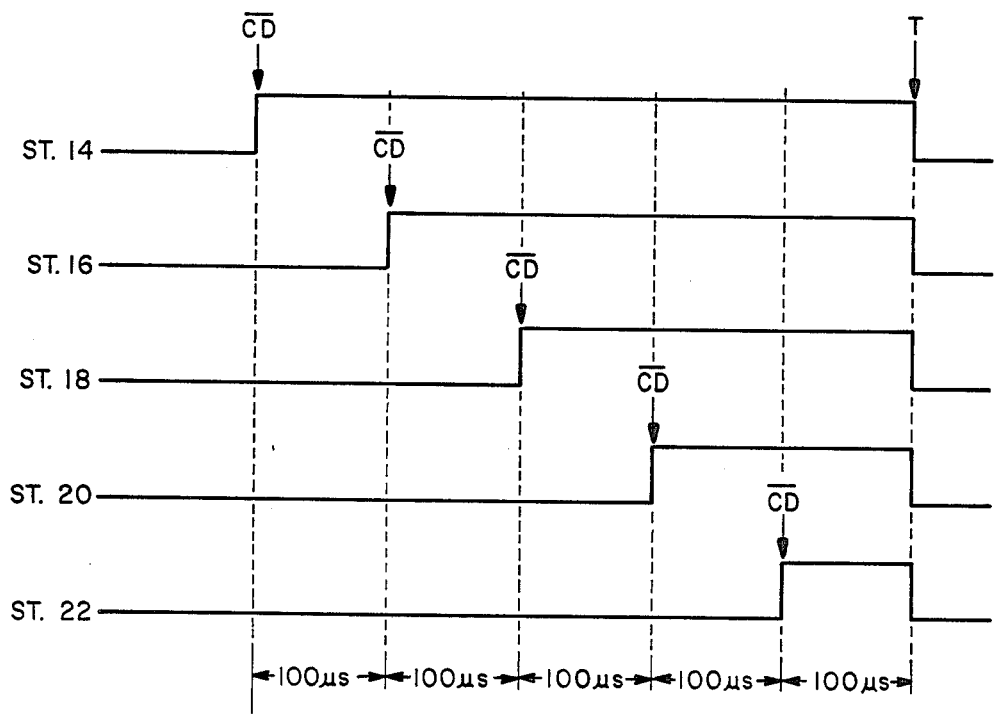
FIG. 3 is a waveform diagram illustrating the synchronous operation of the network of the invention.

FIG. 3 illustrates the synchronous nature of the operation of network 10 according to the invention. In particular, assume that at some previous time a data packet had been transmitted by a station and that the data packet is currently present on the entire forward channel and its carrier being detected by all of the stations 14-22. The foregoing is facilitated since, in a preferred embodiment of the invention, the minimum length of a data packet is equal to the maximum loop delay of network 10. Since each station is detecting the presence of the forward channel carrier, no transmissions from any stations are allowed (i.e., each station is in transmission condition T'). As soon as the end of the data packet propogates past station 14 a CD' signal is generated by the station such that it assumes a T condition 500 microseconds (the access delay of station 14) later at which time transmission is allowed. One hundred microseconds later the end of the data packet propogates past station 16 causing it to generate a CD' signal and, in response thereto, assume a T condition 400 microseconds thereafter. Stations 18, 20 and 22 similarly generate CD' signals at 100 microsecond intervals as the end of the data packet propogates past the stations and assume T conditions 300, 200 and 100 microseconds after the CD' signals. With reference to FIG. 3, it will therefore be observed that each of the stations assumes a T condition at the same time whereby transmissions from the stations will occur coincidentally in the form of a plurality of synchronous equally spaced time slots. Thus, with reference to the headend network translator 24, all transmissions appear to be emanating from station 22. Due to the synchronous nature of the transmissions, early detection of collisions is facilitated. Since a transmission maY be aborted as soon as a collision is detected, unnecessary and wasteful use of the network is avoided.

In accordance with the foregoing, it will be seen that equal station access and synchronous operation of network 10 is achieved by establishing an access delay for each station in inverse relation to its distance from network translator 24. The respective access delay for each station defines a time interval following the detection of no carrier on the forward channel after which a transmission from the respective station is allowed.

While a particular embodiment has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A method for operating a communications network employing a contention access protocol having a plurality of stations interconnected through selected forward and reverse channels by a network translator, each of said channels being defined by a respective carrier, said method comprising the steps of:

establishing for each station an access delay interval representing the difference between a predetermined reference time and the round trip propogation time of a data packet between the respective station and the network translator, said predetermined reference time having a value equal to or greater than the round trip propagation time of a data packet between the network translator and the station most remote therefrom;

continuously monitoring the forward channel at each station for detecting the presence or absence of said forward channel carrier; and enabling a respective station to transmit a data packet as modulation of the reverse channel carrier only after the expiration of a time interval corresponding to the access delay interval of the station during which no carrier is detected on the forward channel at the connection node of the station.

2. The method as defined by claim 1 wherein said monitoring step comprises the further steps of generating at each station a signal CD or a signal CD' in response to the detection of the presence or absence respectively of said forward channel carrier and including the step of establishing for the station a transmit mode T or a non-transmit mode T' during which transmissions are allowed or inhibited respectively, said T' mode being established in response to the generation of said CD signal or in response to the generation of said CD' signal for any continuous time interval less than the respective access delay of the station, the T mode otherwise being established.

3. The method as defined by claim 1 wherein said establishing step comprises the step of deriving said access delay interval for each station by subtracting the round trip propagation time of a data packet between each respective station and the network translator from said predetermined reference time.

4. A method for operating a communications network employing a contention access protocol having a plurality of stations interconnected through selected forward channels and reverse channels by a network translator, each of said channels being characterized by a respective carrier which comprises the steps of:

establishing for each station an access delay interval representing the difference between a predetermined reference time and the round trip propagation time of a data packet between the respective station and said network translator, said predetermined reference time having a value equal to or greater than the round trip propagation time of a data packet between the network translator and the station most remote therefrom;

continuously monitoring the forward channel at each station for generating a signal CD or a signal CD' in response to the detection of the presence or absence respectively of said forward channel carrier; and establishing for the station a transmit mode T or a nontransmit mode T' during which transmission in the form of modulation of the reverse channel carrier is allowed or inhibited respectively, said T' mode being established in response to the generation of said CD signal or in response to the generation of said CD' signal for any continuous time interval less than the respective access delay interval of the station, the T mode otherwise being established.

5. The method as defined by claim 4 wherein said first establishing step comprises deriving said access delay for each station by subtracting the round trip propagation time of a data packet between each respective station and the network translator from said predetermined reference time.

6. A method for operating a communications network employing a carrier sense multiple access with collision detection protocol among a plurality of stations connected to a communication bus with forward and reverse channels, each of said channels being characterized by a respective carrier, interconnection between said stations being provided through a network translator at the headend of said communication bus, said method comprising:

establishing for each station connected to said bus an access delay interval as a function of a time interval greater than or equal to that required for signal propagation along the entire length of said bus in both said reverse and forward channels less the time interval required for signal propagation from the respective station to said network translator on said reverse channel and from said network translator back to the respective stastion on said forward channel;

storing for each station its respective access delay interval;

continuously monitoring the forward channel at each station for generating a signal CD or signal CD' in response to the detection of the presence or absence respectively of a carrier on said forward channel; and establishing for each station a transmit mode T or a non-transmit mode T' during which transmission on the reverse channel is allowed or inhibited respectively, said T'-mode being established in response to the generation of said CD signal or in response to the generation of said CD' signal for any continuous time interval less than the respective access delay interval of each station, said T-mode otherwise being established.

* * * * *